United States Patent
Kang et al.

(10) Patent No.: US 10,138,930 B2
(45) Date of Patent: Nov. 27, 2018

(54) NATURAL GAS HYDRATE TANK CONTAINER LOADING SYSTEM ENABLING AUTOMATED CONNECTION OF ELECTRIC POWER LINE AND BOIL-OFF GAS PIPE

(71) Applicant: Korea Institute of Ocean Science and Technology, Gyeonggi-do (KR)

(72) Inventors: Hee Jin Kang, Chungcheongnam (KR); Gyeong Joong Lee, Daejeon (KR); Beom Jin Park, Daejeon (KR)

(73) Assignee: KOREA INSTITUTE OF OCEAN SCIENCE AND TECHNOLOGY, Gyeonggi-Do (KR)

( * ) Notice: Subject to any disclaimer, the term of this patent is extended or adjusted under 35 U.S.C. 154(b) by 0 days.

(21) Appl. No.: 15/521,119

(22) PCT Filed: Dec. 17, 2014

(86) PCT No.: PCT/KR2014/012447
§ 371 (c)(1),
(2) Date: Apr. 21, 2017

(87) PCT Pub. No.: WO2016/085028
PCT Pub. Date: Jun. 2, 2016

(65) Prior Publication Data
US 2017/0356599 A1    Dec. 14, 2017

(30) Foreign Application Priority Data

Nov. 27, 2014 (KR) .................. 10-2014-0167302

(51) Int. Cl.
*F17C 13/04* (2006.01)
*F17C 13/08* (2006.01)
(Continued)

(52) U.S. Cl.
CPC ............ *F16C 13/026* (2013.01); *B63B 25/04* (2013.01); *B63B 25/08* (2013.01); *B63J 3/00* (2013.01);
(Continued)

(58) Field of Classification Search
CPC ............ F17C 13/045; F17C 2205/0169; F17C 2205/037; F17C 2205/0382; B63J 2003/003; H01R 13/62
See application file for complete search history.

(56) References Cited

U.S. PATENT DOCUMENTS

| | | | |
|---|---|---|---|
| 2011/0215640 A1* | 9/2011 | Donnelly | H02J 1/10 307/21 |
| 2014/0026991 A1* | 1/2014 | Verghade | F17C 13/084 137/561 A |
| 2014/0326429 A1* | 11/2014 | Kang | F17C 1/12 165/11.1 |

FOREIGN PATENT DOCUMENTS

| | | |
|---|---|---|
| KR | 10-0840059 | 6/2008 |
| KR | 10-0941485 | 2/2010 |

(Continued)

OTHER PUBLICATIONS

PCT International Search Report and Written Opinion issued in connection with PCT/KR2014/012447 dated Aug. 6, 2015 with English translation.

(Continued)

*Primary Examiner* — John F Pettitt
(74) *Attorney, Agent, or Firm* — Dentons US LLP (57) ABSTRACT

The present invention relates to a natural gas hydrate tank container loading system for transporting natural gas hydrate, and the present invention provides a natural gas hydrate tank container loading system which enables automated connection of an electric power line and a boil-off pipe, and may automatically connect an electric power line (Continued)

and automatically connect the pipe by simultaneously stacking respective natural gas hydrate tank containers, in order to solve problems of a transportation method using the existing natural gas hydrate tank containers in the related art in that an operation of connecting an electric power line to a refrigerator for minimizing the occurrence of boil-off gas and maintaining a phase equilibrium condition in the tank containers and an operation of connecting the pipe for discharging the boil-off gas need to be manually and individually performed for long-distance transportation of a large amount of natural gas hydrate by using a ship, which causes an inconvenience.

9 Claims, 6 Drawing Sheets (51) Int. Cl.
| | | |
|---|---|---|
| F16C 13/02 | (2006.01) | |
| B63B 25/04 | (2006.01) | |
| B63J 3/00 | (2006.01) | |
| H02S 10/00 | (2014.01) | |
| B63B 25/08 | (2006.01) | |
| H01R 13/00 | (2006.01) | |
| H01R 13/629 | (2006.01) | |
| H02J 3/38 | (2006.01) | |
| H02K 7/18 | (2006.01) | |
| F17C 1/00 | (2006.01) | |
| F17C 13/12 | (2006.01) | |

(52) U.S. Cl.
CPC .............. *F17C 1/002* (2013.01); *F17C 13/04* (2013.01); *F17C 13/082* (2013.01); *F17C 13/126* (2013.01); *H01R 13/005* (2013.01); *H01R 13/629* (2013.01); *H02J 3/383* (2013.01); *H02K 7/1815* (2013.01); *H02S 10/00* (2013.01); *B63B 2025/087* (2013.01); *B63J 2003/002* (2013.01); *B63J 2003/007* (2013.01); *F17C 2201/0119* (2013.01); *F17C 2201/054* (2013.01); *F17C 2205/0107* (2013.01); *F17C 2205/0111* (2013.01); *F17C 2205/0157* (2013.01); *F17C 2205/0169* (2013.01); *F17C 2205/0323* (2013.01); *F17C 2205/0352* (2013.01); *F17C 2205/0373* (2013.01); *F17C 2221/033* (2013.01); *F17C 2221/036* (2013.01); *F17C 2223/0184* (2013.01); *F17C 2227/0157* (2013.01); *F17C 2227/0337* (2013.01); *F17C 2227/0376* (2013.01); *F17C 2227/0383* (2013.01); *F17C 2250/03* (2013.01); *F17C 2250/043* (2013.01); *F17C 2250/0439* (2013.01); *F17C 2250/0652* (2013.01); *F17C 2260/021* (2013.01); *F17C 2260/056* (2013.01); *F17C 2265/02* (2013.01); *F17C 2265/031* (2013.01); *F17C 2265/04* (2013.01); *F17C 2265/07* (2013.01); *F17C 2270/0105* (2013.01)

(56) References Cited

FOREIGN PATENT DOCUMENTS

| KR | 10-2012-0014820 | 2/2012 |
|---|---|---|
| KR | 10-1149498 | 5/2012 |
| KR | 10-1255547 | 4/2013 |
| KR | 10-1262647 | 5/2013 |
| KR | 10-2014-0065588 | 5/2014 |
| WO | WO/2011/138988 A1 | 11/2011 |

OTHER PUBLICATIONS

Korean Office Examination Report issued in connection with related Korean Patent Application No. KR 10-2014-0167302 dated Aug. 30, 2016 with English translation.

* cited by examiner

NATURAL GAS HYDRATE TANK CONTAINER LOADING SYSTEM ENABLING AUTOMATED CONNECTION OF ELECTRIC POWER LINE AND BOIL-OFF GAS PIPE

CROSS-REFERENCE TO RELATED APPLICATIONS

This application is the Section 371 National Stage of PCT/KR2014/012447 filed Dec. 17, 2014, the entirety of which is incorporated herein by reference to the extent permitted by law. This application claims the benefit of priority to Korean Patent Application No. KR10-2014-0167302, filed Nov. 27, 2014, the entirety of which is incorporated herein by reference to the extent permitted by law.

TECHNICAL FIELD

The present invention relates to a loading system for transporting natural gas hydrate, and more particularly, to a natural gas hydrate tank container loading system which enables automated connection of an electric power line and a boil-off gas pipe, may stack and transport a plurality of natural gas hydrate tank containers for transporting the natural gas hydrate, and may automatically connect the electric power line only by stacking the respective containers without manually and individually performing, unlike the related art, connection of the electric power line for supplying electric power to a refrigerator for inhibiting the occurrence of boil-off gas (BOG) which naturally occurs in the respective natural gas hydrate tank containers during transportation of the natural gas hydrate.

In addition, the present invention relates to the natural gas hydrate tank container loading system configured as described above, which enables automated connection of the electric power line and the boil-off gas pipe, and may automatically connect the pipe only by stacking the respective containers without manually and individually performing, unlike the related art, connection of the boil-off gas pipe for discharging the boil-off gas BOG generated in the respective containers.

BACKGROUND ART

In general, hydrate is a solid substance in the form of ice including water molecules and gas molecules, and the hydrate is created as water and gas molecules come into contact with each other under predetermined pressure and a predetermined temperature. The hydrate is dissociated into water and gas molecules by changing pressure or a temperature, and the hydrate has high gas concentration because the hydrate has a crystal structure in which gas molecules are disposed in spaces made by water molecules, and as a result, the hydrate attracts attention as a new means for transporting and storing natural gas which is substituted for LNG.

That is, it has been known that because the natural gas hydrate has a phase equilibrium (self-preservation) effect under a predetermined temperature and pressure condition, the natural gas hydrate may accommodate methane gas as much as up to 170 times a volume of the natural gas hydrate, and the phase equilibrium may be maintained when the natural gas hydrate is stored and transported at a temperature of about −20° C. Here, as examples in the related art for transporting the natural gas hydrate, for example, Korean Patent No. 10-0840059 discloses a natural gas transporting means configured such that hydrated natural gas is sealed and stored in container type storage containers, the container type storage containers are stacked on a transport ship in a container stack pattern, a hermetic protective cover is installed at an upper side of the transport ship so that the stacked containers are included, a portion between the protective cover and the container type storage container is filled with inert gas, and a constant temperature is maintained in the protective cover by an inert gas cooling unit installed to be connected to the protective cover. In addition, Korean Patent No. 10-1149498 discloses a natural gas hydrate container which includes a main body which has a natural gas hydrate storage space that is sealed or opened by a door, a cooling unit which is installed in a main body so as to cool the storage space, a discharge port which is provided in the main body so as to discharge natural gas from the storage space and controls a discharge of natural gas, and a drain port which is provided in the main body so as to discharge water from the storage space and controls a discharge of water.

Further, as another example in the related art for transporting the natural gas hydrate, for example, Korean Patent No. 10-1262647 discloses a natural gas hydrate loading apparatus capable of efficiently loading a large amount of NGH because the NGH is loaded directly into a cargo hold of an NGH transport ship by using a loading apparatus installed outside the NGH transport ship, such that it is not necessary to install additional equipment for loading the NGH to the NGH transport ship, and thus ship costs and maintenance costs for the NGH transport ship are reduced, and a shape of the cargo hold of the NGH transport ship is efficiently made. In addition, Korean Patent Application Laid-Open No. 10-2014-0065588 discloses an apparatus and a method for unloading gas hydrate which are capable of unloading marine-transported gas hydrate in a gasified state to the ground by using a floating cargo hold separable from the transport ship, and a dock that confines the cargo hold to the interior of the dock.

Various technologies for loading and transporting the natural gas hydrate have been presented in the related art as described above, but the natural gas hydrate transportation method in the related art has the following problems.

That is, because boil-off gas (BOG) is partially generated even in a case in which phase equilibrium of the natural gas hydrate is maintained, the boil-off gas causes an increase in pressure in a transport container such as a tank container, and the amount of generated boil-off gas may be rapidly increased in a case in which a predetermined temperature and pressure condition cannot be satisfied due to damage or a breakdown of the transport container such as the tank container.

Therefore, to minimize the amount of generated boil-off gas and maintain a phase equilibrium condition in the transport container such as the tank container, a refrigerator is installed and operated in the transport container such as the tank container in the related art.

However, in general, there is a practical limitation in connecting electric power lines individually to the transport container such as the tank container, which loads and transports the natural gas hydrate with several thousands of TEU, and operating the refrigerator, and as a result, there is a problem in that to transport a large number of transport containers such as the tank container to a long distance by using the existing ships such as a container ship, it is necessary to maintain an appropriate temperature and pressure condition for maintaining phase equilibrium and to manage boil-off gas (BOG) which occurs naturally.

In more detail, because the transport container such as the tank container is an adiabatic compression container, it is not greatly necessary to supply a heat quantity by the refrigerator in a case in which a transportation distance is short, but in a case in which a transportation distance becomes long, it is necessary to adjust a temperature condition for phase equilibrium by means of the refrigerator and the like because it may be difficult to maintain a temperature and pressure required for phase equilibrium of the adiabatic compression container over time.

In addition, it is necessary to improve a pressure resistance capacity of the transport container in order to prevent the occurrence of a risk that pressure in the transport container such as the tank container is excessively increased due to the boil-off gas (BOG) and the transport container is damaged, but the improvement of the pressure resistance capacity of the transport container causes a problem of a decrease in the amount of loaded natural gas hydrate caused by a limitation in weight for each unit tank container because of an increase in load of the transport container itself, and a problem of an increase in transport container manufacturing costs.

Further, in a case in which the boil-off gas is discharged to the outside of the transport container such as the tank container in order to prevent an increase in internal pressure, there is a problem of the occurrence of fire caused by lightning, friction, or spark, or a problem of environmental pollution.

Furthermore, in the related art, an operation of connecting the electric power line to the refrigerator and an operation of connecting a pipe for discharging boil-off gas need to be manually and individually performed after stacking the respective natural gas hydrate tank containers during transportation of the natural gas hydrate, and as a result, there is a problem in that the operations of connecting the electric power line and the pipe are very inconvenient and require a large amount of time.

Therefore, to solve the problems of the transportation method using the natural gas hydrate tank container in the related art, it is preferred to provide a natural gas hydrate tank container loading system which has a new configuration, may stack and transport a plurality of transport containers such as the tank container without excessively remodeling the existing ship such as a container ship or incurring costs, may stably supply electric power to the refrigerator for maintaining phase equilibrium of the respective transport containers during transportation with a simple configuration and low costs, and may effectively treat boil-off gas generated in the respective transport containers without discharging the boil-off gas to the outside, but an apparatus or a method, which meets all of the requirements, is not yet provided.

In addition, to solve the problems of a transportation method using the natural gas hydrate tank containers in the related art in that the operation of connecting the electric power line to the refrigerator and the operation of connecting the pipe for discharging boil-off gas need to be manually and individually performed after stacking the containers, which causes an inconvenience, it is preferred to provide an electric power line and pipe connecting structure for a natural gas hydrate tank container loading system which has a new configuration, and may automatically connect the electric power line and automatically connect the pipe by simultaneously stacking the respective containers, but an apparatus or a method, which meets all of the requirements, is not yet provided.

DOCUMENTS OF RELATED ART

1. Korean Patent No. 10-0840059 (Jun. 13, 2008)
2. Korean Patent No. 10-1149498 (May 17, 2012)
3. Korean Patent No. 10-1262647 (May 2, 2013)
4. Korean Patent Application Laid-Open No. 10-2014-0065588 (May 30, 2014)

DISCLOSURE

Technical Problem

The present invention has been made in an effort to solve the aforementioned problems in the related art, and an object of the present invention is to provide a natural gas hydrate tank container loading system which enables automated connection of an electric power line and a boil-off gas pipe, and may automatically connect the electric power line and automatically connect the pipe by simultaneously stacking respective natural gas hydrate tank containers, in order to solve problems of a transportation method using the natural gas hydrate tank container in the related art in that an operation of connecting the electric power line to a refrigerator for minimizing the amount of generated boil-off gas (BOG) and maintaining a phase equilibrium condition in the tank container and an operation of connecting the pipe for discharging the boil-off gas need to be manually and individually performed for transporting a large amount of natural gas hydrate to a long distance by using a ship, which causes an inconvenience.

Technical Solution

To achieve the aforementioned object, the present invention provides a natural gas hydrate tank container loading system enabling automated connection of an electric power line and a boil-off gas pipe, which solves problems of natural gas hydrate transportation methods in the related art in that an operation of connecting the electric power line to a refrigerator for maintaining a phase equilibrium condition in a natural gas hydrate tank container and an operation of connecting the pipe for discharging boil-off gas generated in the respective natural gas hydrate tank containers are manually and individually performed during long-distance transportation of natural gas hydrate, which causes an inconvenience, the natural gas hydrate tank container loading system comprising: a plurality of natural gas hydrate tank containers which is stacked in a vertical direction; a refrigerator which is installed at one side of each of the natural gas hydrate tank containers for maintaining phase equilibrium of natural gas hydrate stored in each of the natural gas hydrate tank containers; an electric power supply unit which is installed at an upper portion of an uppermost container among the plurality of the gas hydrate tank containers stacked in the vertical direction for supplying electric power for operating the respective refrigerators; an electric power line which is installed at one side of the natural gas hydrate tank container and includes a connecting structure formed to be engaged with both ends for supplying electric power produced by the electric power supply unit to the respective refrigerators; and a boil-off gas pipe which is installed at one side of the natural gas hydrate tank container and includes a connecting structure formed to be engaged with both ends for supplying boil-off gas generated from the respective natural gas hydrate tank containers to the electric power supply unit.

Here, the loading system may further include: a sensor unit which includes a plurality of sensors including temperature and pressure sensors for detecting a current state including an internal temperature or pressure in the respective natural gas hydrate tank containers; and a control unit which controls operations of the refrigerator and the electric power supply unit and an overall operation of the loading system based on the state detected by the respective sensors of the sensor unit.

In addition, the electric power supply unit may include a photovoltaic array which generates electric power by using sunlight, an electric generator which is operated by boil-off gas generated from the respective natural gas hydrate tank containers, a fuel tank which stores fuel to be supplied to the electric generator, a compressor which mixes fuel supplied from the fuel tank with boil-off gas generated from the natural gas hydrate tank container and supplies the mixed fuel and boil-off gas to the electric generator, a battery (rechargeable battery cells) which stores electrical energy generated by the photovoltaic array and the electric generator, a fuel safety device which prevents fire and explosion caused by a reverse flow during combustion of the boil-off gas, and a housing which accommodates the electric generator, the fuel tank, the compressor, the battery, and the fuel safety device, and the electric power supply unit may charge the battery by the electric generator operated by using the photovoltaic array and the boil-off gas (BOG), and may operate the refrigerator and the compressor by using electrical energy with which the battery is charged, such that phase equilibrium in the respective natural gas hydrate tank container is always maintained without being supplied with separate electric power.

Further, the loading system may further include a display unit which displays the current state including an internal temperature and pressure in the respective natural gas hydrate tank containers which is detected by the sensor unit so that the current state is monitored from the outside, a communication unit which transmits the current state of the loading system to the outside, and a fire extinguisher which copes with fire.

Further, the electric power line may be configured such that a sloped water proof hinge type plug, which is hingedly connected in a state of being inclined and opened and closed by a compressive spring installed at a lower side of the sloped water proof hinge type plug, is installed at one end and fixed to a lower side of the natural gas hydrate tank container in order to prevent an electric leakage caused by an inflow of foreign substances including rainwater and protect an electrode in the sloped water proof hinge type plug, and a pressor foot, which presses a socket coupled to the electrode of the sloped waterproof hinge type plug and the sloped waterproof hinge type plug, is formed at the other end side and fixed to an upper side of the natural gas hydrate tank container, and the connecting structure is formed at both ends of the electric power line, such that when the upper gas hydrate tank container is stacked in the vertical direction, the electrode is exposed as the pressor foot presses the sloped waterproof hinge type plug installed on the lower gas hydrate tank container and the sloped waterproof hinge type plug is inserted into the socket installed on the upper gas hydrate tank container, such that the sloped waterproof hinge type plug and the socket are automatically coupled to each other, and when removing the upper gas hydrate tank container, the sloped waterproof hinge type plug and the socket are separated from each other, the sloped waterproof hinge type plug automatically returns back to the original state by the compressive spring, such that operations of connecting and disconnecting the electric power line is automatically performed just by loading and unloading the gas hydrate tank containers.

In addition, the boil-off gas pipe may include: a conical valve opening and closing protrusion which is installed at one end side of the boil-off gas pipe so as to be opened by being pressed downward and closed when pressure is eliminated; a compressive spring which is installed at a lower side of the valve opening and closing protrusion; a connector which is installed at the other end side of the boil-off gas pipe so as to be coupled to the valve opening and closing protrusion; and a fixing means which fixes the valve opening and closing protrusion, the compressive spring, and the connector to upper and lower ends of the natural gas hydrate tank container, respectively, such that a connection valve, which is automatically opened as the valve opening and closing protrusion and the connector come into contact with each other when stacking the natural gas hydrate tank containers, is formed, and when the upper gas hydrate container is stacked in the vertical direction, the valve opening and closing protrusion of the lower gas hydrate tank container is automatically coupled to the connector of the upper gas hydrate tank container as the valve opening and closing protrusion of the lower gas hydrate tank container is inserted into the connector of the upper gas hydrate tank container, the valve opening and closing protrusion is automatically opened as the compressive spring is pressed by a load of the upper gas hydrate tank container, and when the upper container is removed, the valve opening and closing protrusion is closed as the valve opening and closing protrusion automatically returns back to the original state by the compressive spring, such that operations of connecting and disconnecting the boil-off gas pipe are automatically performed just by loading and unloading the gas hydrate tank containers.

In addition, the present invention provides a natural gas hydrate transportation ship comprising the natural gas hydrate tank container loading system enabling automated connection of a boil-off gas pipe.

Further, the present invention provides a natural gas hydrate transportation method configured to transport natural gas hydrate by using the natural gas hydrate tank container loading system enabling automated connection of a boil-off gas pipe.

Effect

According to the present invention as described above, there is provided the natural gas hydrate tank container loading system which enables automated connection of the electric power line and the boil-off gas pipe, and may automatically connect the electric power line and automatically connect the pipe by simultaneously stacking respective natural gas hydrate tank containers, thereby solving the problems of the transportation methods using the natural gas hydrate tank container in the related art in that the operation of connecting the electric power line to the refrigerator and the operation of connecting the pipe for discharging boil-off gas need to be manually and individually performed after stacking the respective natural gas hydrate tank containers, which causes an inconvenience.

BEST MODE

Hereinafter, a specific exemplary embodiment of a natural gas hydrate tank container loading system enabling automated connection of an electric power line and a boil-off gas pipe according to the present invention will be described with reference to the accompanying drawings.

Here, it is noted that the following description is just one exemplary embodiment for implementing the present invention, and the present invention is not limited only to the contents of the exemplary embodiment to be described below.

In addition, it is noted that in the description of the exemplary embodiment of the present invention, descriptions of parts, which are determined as being identical or similar to parts in the related art or being easily understood and implemented by those skill in the art, will be omitted for briefly describing the present invention.

That is, as described below, the present invention relates to a natural gas hydrate tank container loading system which enables automated connection of an electric power line and a boil-off gas pipe, and may automatically connect the electric power line and automatically connect the pipe by simultaneously stacking respective natural gas hydrate tank containers, in order to solve problems of a transportation method using the natural gas hydrate tank container in the related art in that an operation of connecting the electric power line to a refrigerator for minimizing the amount of generated boil-off gas (BOG) and maintaining a phase equilibrium condition in the tank container and an operation of connecting the pipe for discharging the boil-off gas need to be manually and individually performed for transporting a large amount of natural gas hydrate to a long distance by using a ship, which causes an inconvenience.

Next, a specific exemplary embodiment of the natural gas hydrate tank container loading system enabling automated connection of the electric power line and the boil-off gas pipe according to the present invention, which is configured as described above, will be described with reference to the drawings.

Figure 1:
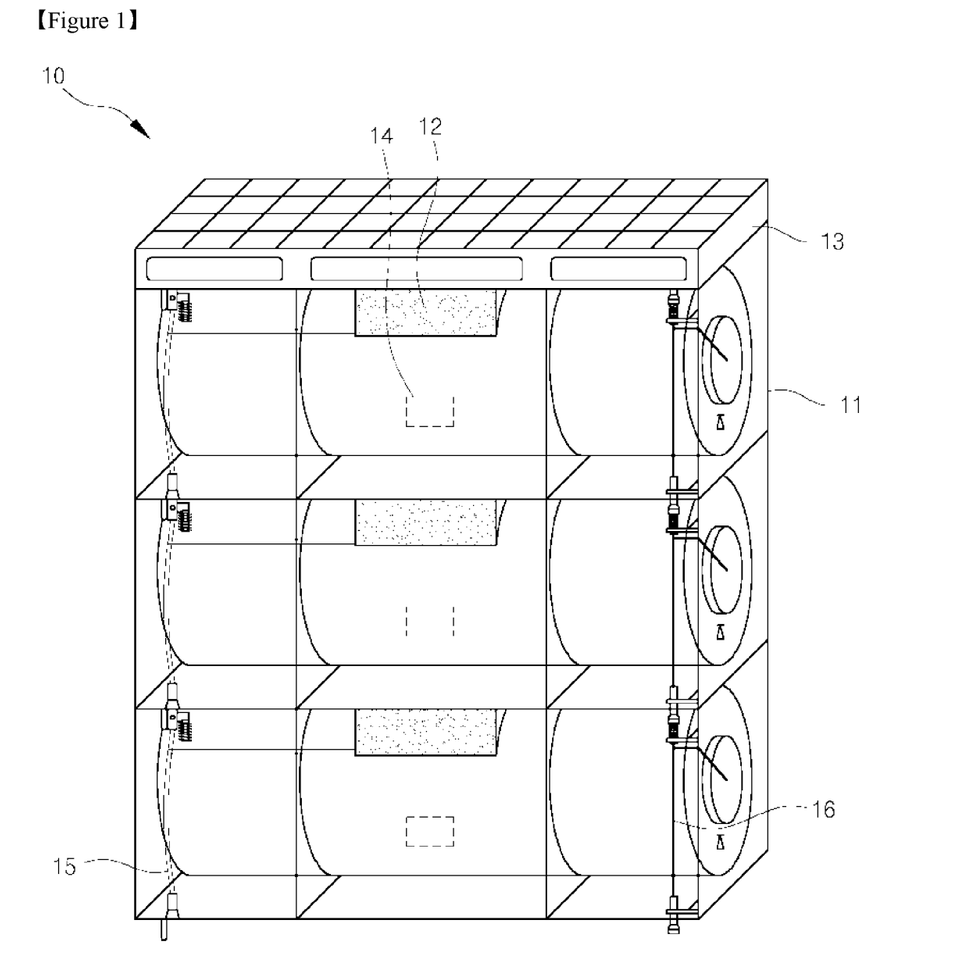
FIG. 1 is a view schematically illustrating an entire configuration of a natural gas hydrate tank container loading system enabling automated connection of an electric power line and a boil-off gas pipe according to an exemplary embodiment of the present invention.

First, referring to FIG. 1, FIG. 1 is a view schematically illustrating an entire configuration of the natural gas hydrate tank container loading system enabling automated connection of the electric power line and the boil-off gas pipe according to the exemplary embodiment of the present invention.

As illustrated in FIG. 1, a natural gas hydrate tank container loading system 10 enabling automated connection of an electric power line and a boil-off gas pipe according to the exemplary embodiment of the present invention roughly includes a plurality of natural gas hydrate tank containers 11 which is stacked to be stacked in a vertical direction, a refrigerator 12 which is installed at one side of each of the natural gas hydrate tank containers in order to maintain phase equilibrium of natural gas hydrate stored in each of the stacked natural gas hydrate tank containers, an electric power supply unit 13 which is installed at an upper end of the natural gas hydrate tank container 11, and includes an electric generator and a battery operated by using a photovoltaic array and boil-off gas (BOG) for supplying electric power for operating the respective refrigerators 12, a sensor unit 14 which includes various types of sensors such as temperature and pressure sensors for detecting a state such as an internal temperature or pressure in the respective natural gas hydrate tank containers, an electric power line 15 which is installed at one side of the natural gas hydrate tank container 11, and includes a connecting structure formed to be engaged with both ends for supplying electric power produced by the electric power supply unit 13 to the refrigerator 12 of each of the natural gas hydrate tank containers, and a control unit (not illustrated) which includes a connecting structure formed to be engaged with both ends for supplying boil-off gas generated from the respective natural gas hydrate tank containers to an electric generator installed in the electric power supply unit 13 together with fuel, and controls operations of the refrigerator and the electric power supply unit 13 and an overall operation of the loading system 10 based on the state detected by the respective sensors of the sensor unit 14 and a boil-off gas pipe 16 installed at one side of the natural gas hydrate tank container 11.

Further, although not illustrated, the loading system 10 may further include a display unit which displays the current state such as an internal temperature, and pressure in the respective natural gas hydrate tank containers which is detected by the sensor unit 14 so that the current state may be monitored from the outside, a communication unit which transmits the state of the loading system 10 to the outside, and a fire extinguisher which copes with fire that may occur at the electric generator operated by using the boil-off gas, and the refrigerator for maintaining the phase equilibrium in the natural gas hydrate tank container.

That is, as illustrated in FIG. 1, the natural gas hydrate tank container loading system 10 enabling automated connection of the electric power line and the boil-off gas pipe according to the exemplary embodiment of the present invention is characterized by charging the battery by collecting electric power from the electric generator operated by using the boil-off gas (BOG) and the photovoltaic array installed to an uppermost container among the gas hydrate transport containers such as tank containers stacked in the vertical direction, and operating the refrigerator and a compressor for maintaining a phase equilibrium condition of the natural gas hydrate by using the electrical energy with which the battery is charged, and in this case, the operations of connecting the electric power line 15 and connecting the boil-off gas pipe 16 may be automatically performed by using the electric power line 15 and the boil-off gas pipe 16 having the connecting structures formed at both ends as described below without having to manually and individually performing the operations of connecting the electric power line 15 and connecting the boil-off gas pipe 16 unlike the related art.

Figure 2:
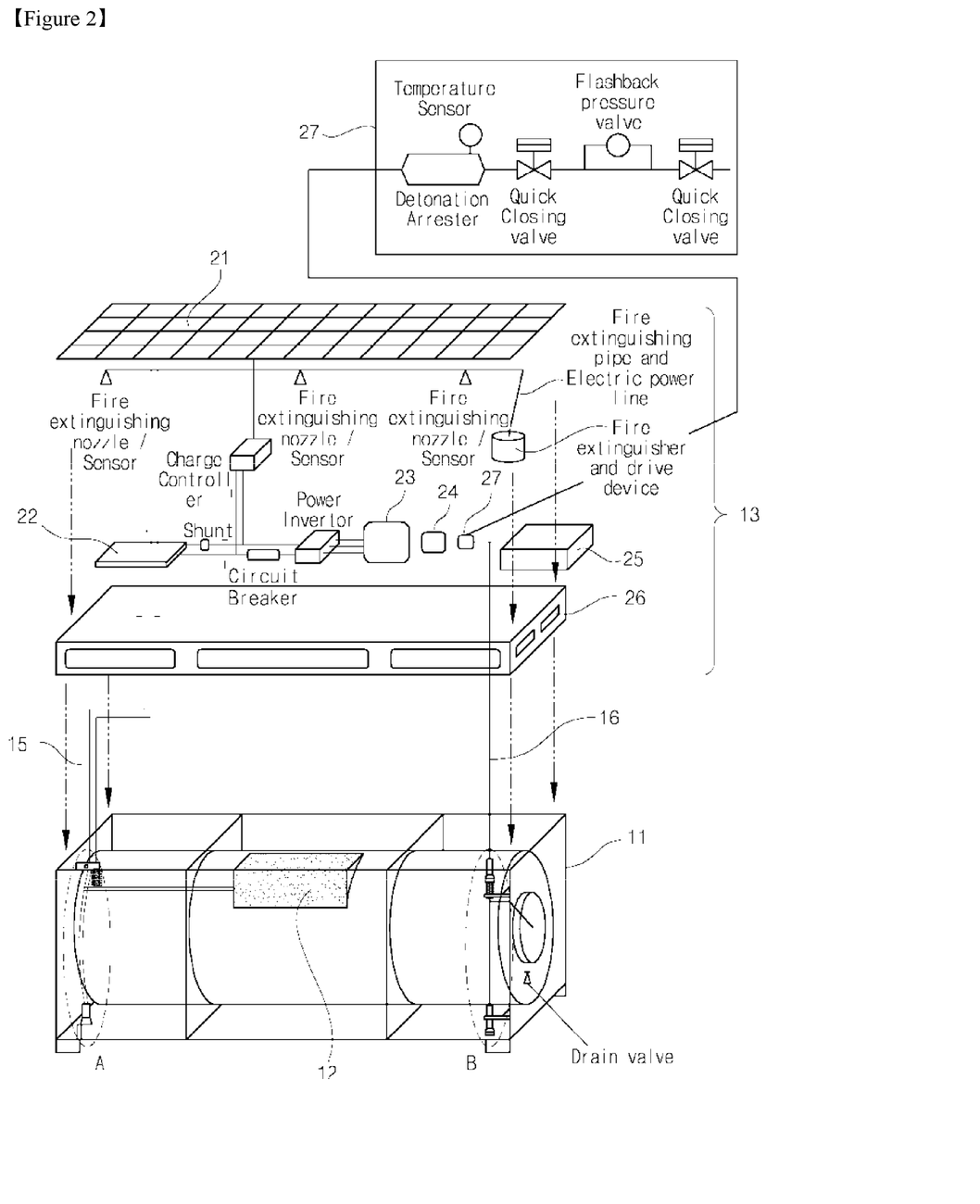
FIG. 2 is a view schematically illustrating a specific configuration of an electric power supply unit of the natural gas hydrate tank container loading system enabling automated connection of the electric power line and the boil-off gas pipe according to the exemplary embodiment of the present invention which is illustrated in FIG. 1.

In more detail, referring to FIG. 2, FIG. 2 is a view schematically illustrating a specific configuration of the electric power supply unit 13 of the natural gas hydrate tank container loading system 10 enabling automated connection of the electric power line and the boil-off gas pipe according to the exemplary embodiment of the present invention which is illustrated in FIG. 1.

As illustrated in FIG. 2, the electric power supply unit 13 includes a photovoltaic array 21 which generates electric power by using sunlight, and a battery (rechargeable battery cells) 22 which stores the electrical energy generated by the photovoltaic array 21, such that the electric power supply unit 13 is configured to operate the refrigerators 12 for maintaining phase equilibrium in the respective natural gas hydrate tank containers without being supplied with separate electric power.

Here, for example, the electric power supply unit 13 has a separate electric generator 23, a compressor 24, and a fuel tank 25 which are provided in a housing 26, as illustrated in FIG. 2, so as to charge the embedded battery 22 in order to prepare for a situation in which an insufficient amount of electric power is generated by the photovoltaic array 21 due to a weather condition or the like.

In more detail, in addition to the operation of generating electric power by using the photovoltaic array 21, the electric power supply unit 13 is configured such that valves for discharging the boil-off gas (BOG) are installed to the natural gas hydrate tank containers, respectively, mixture gas is produced by mixing the boil-off gas (BOG) generated from the respective natural gas hydrate tank containers with fuel stored in the fuel tank 25 through the boil-off gas pipe 16, and the electric generator 23 is operated by supplying the mixture gas produced as described above to the electric generator 23 through the compressor 23, and as a result, it is possible to always ensure electric power sufficient to operate the respective refrigerators regardless of external factors such as a weather condition, and it is possible to treat the boil-off gas (BOG) generated from the respective natural gas hydrate tank containers in the natural gas hydrate tank container loading system 10 without discharging the boil-off gas to the outside, thereby eliminating a problem of environmental pollution or fire caused by a discharge of the boil-off gas (BOG) unlike the related art.

Figure 3:
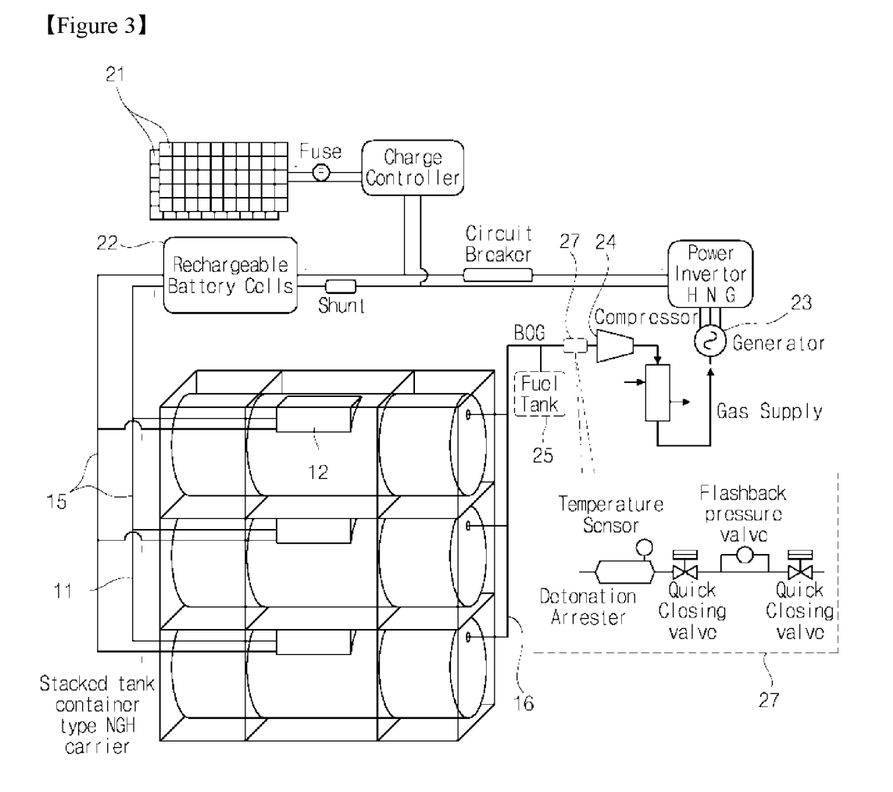
FIG. 3 is a view illustrating an entire configuration of the natural gas hydrate tank container loading system enabling automated connection of the electric power line and the boil-off gas pipe according to the exemplary embodiment of the present invention.

That is, referring to FIG. 3, FIG. 3 is a view illustrating a concept of an entire configuration of the natural gas hydrate tank container loading system 10 enabling automated connection of the electric power line and the boil-off gas pipe according to the exemplary embodiment of the present invention which is configured as described above.

Here, as illustrated in FIGS. 2 and 3, the electric power supply unit 13 includes a temperature sensor, a detonation arrester, a quick closing valve, and a flashback pressure valve, and may further include a fuel safety device 27 which is included in the housing 26 and configured to prevent fire and explosion caused by a reverse flow during combustion of the boil-off gas (BOG).

Therefore, the natural gas hydrate tank container loading system 10 enabling automated connection of the electric power line and the boil-off gas pipe according to the present invention may be implemented as illustrated in FIGS. 1 to 3, and as a result, it is possible to operate the refrigerator by charging the battery with electrical energy collected by the photovoltaic array 21, and thus to operate the refrigerator for maintaining phase equilibrium of the natural gas hydrate without being supplied with separate electric power, and in addition, the battery is also charged with electric power generated by operating the electric generator by using the boil-off gas BOG, and as a result, it is possible to ensure electric power sufficient to operate the refrigerator even in a case in which a weather condition is worsen which is a drawback in photovoltaic generation, such that it is possible to transport the natural gas hydrate to a long distance without having a separate electric power supply device, and thus to solve a problem of fire or environmental pollution caused by a discharge of the boil-off gas.

In addition, the natural gas hydrate tank container loading system 10 enabling automated connection of the electric power line and the boil-off gas pipe according to the exemplary embodiment of the present invention, which is configured as described above, may include an electric power line connecting structure which automatically connects the electric power line which is connected manually in the related art, and a boil-off gas pipe connecting structure which automatically connects a boil-off gas capturing pipe which is connected manually in the related art, as described below.

Next, specific configurations of the electric power line connecting structure and the boil-off gas pipe connecting structure, which are configured to automatically perform the connection operations, which are performed manually in the related art, will be described with reference to FIGS. 4 to 6.

Figure 4:
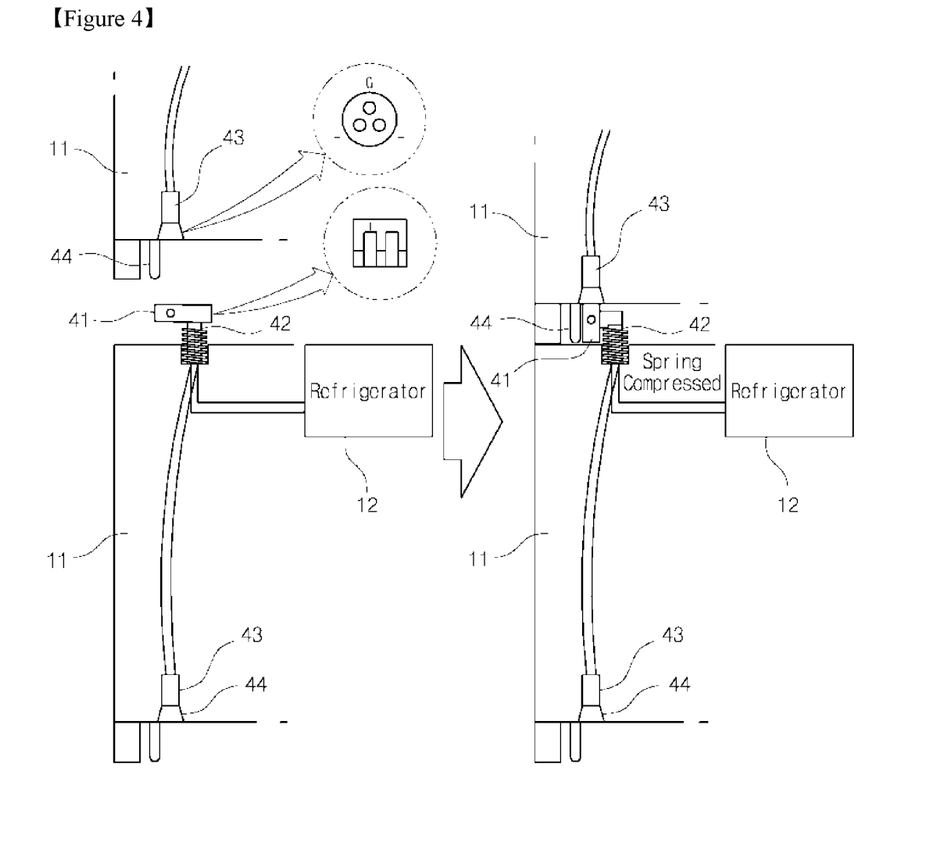
FIG. 4 is a view schematically illustrating an electric power line connecting structure of the natural gas hydrate tank container loading system enabling automated connection of the electric power line and the boil-off gas pipe according to the present invention.

First, referring to FIG. 4, FIG. 4 is a view schematically illustrating the electric power line connecting structure of the natural gas hydrate tank container loading system 10 enabling automated connection of the electric power line and the boil-off gas pipe according to the present invention, that is, FIG. 4 illustrates a specific configuration of part A indicated by a dotted line in FIG. 2.

Figure 5:
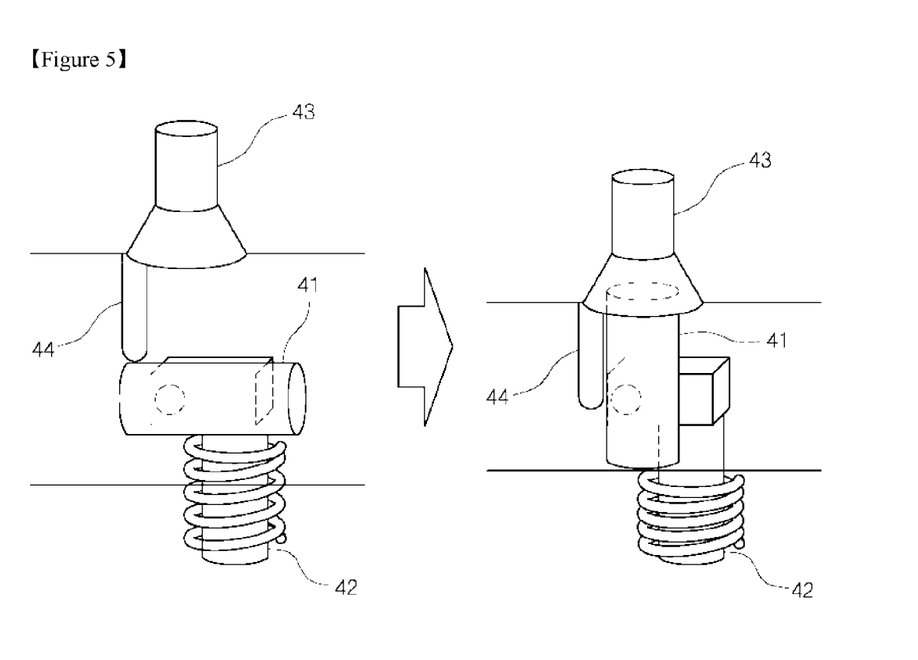
FIG. 5 is a view schematically illustrating a specific configuration of the electric power line connecting structure of the natural gas hydrate tank container loading system enabling automated connection of the electric power line and the boil-off gas pipe according to the present invention which is illustrated in FIG. 4.

In addition, referring to FIG. 5, FIG. 5 is a view schematically illustrating a specific configuration of the electric power line connecting structure of the natural gas hydrate tank container loading system 10 enabling automated connection of the electric power line and the boil-off gas pipe according to the present invention which is illustrated in FIG. 4.

In more detail, as illustrated in FIGS. 4 and 5, in the electric power line connecting structure of the natural gas hydrate tank container loading system enabling automated connection of the electric power line and the boil-off gas pipe according to the exemplary embodiment of the present invention, one end side of the electric power line is configured to protect an electrode in a plug by a sloped water proof hinge type plug 41, which is hingedly connected in a state of being inclined to prevent an electric leakage caused by an inflow of rainwater or the like at normal times, and a compressive spring 42 installed below the sloped waterproof hinge type plug 41, and the other end side of the electric power line is configured to have a socket 43 coupled to the electrode of the sloped waterproof hinge type plug 41 and a pressor foot 44 for pressing the sloped waterproof hinge type plug 41 and to be fixed in the vicinity of upper and lower ends of the containers.

As described above, connecting structures are configured at both end sides of the electric power line 15, and as a result, as illustrated in FIGS. 4 and 5, when the upper gas hydrate tank container is stacked in the vertical direction, the electrode is exposed as the pressor foot 44 presses the sloped waterproof hinge type plug 41 and the sloped waterproof hinge type plug 41 is inserted into the socket 43 of the upper electric power line, such that the sloped waterproof hinge type plug 41 and the socket 43 are automatically coupled to each other, and when the sloped waterproof hinge type plug 41 and the socket 43 are separated from each other when removing the upper container, the sloped waterproof hinge type plug 41 automatically returns back to the original state by the compressive spring 42.

Therefore, an operation of connecting the electric power line for operating the refrigerator is manually and individually performed in the related art, but according to the electric power line connecting structure of the natural gas hydrate tank container loading system enabling automated connection of the electric power line and the boil-off gas pipe according to the exemplary embodiment of the present invention, the connecting structures are formed at both end sides of the electric power line as illustrated in FIGS. 4 and 5, and as a result, it is possible to automatically perform operations of connecting and disconnecting the electric power line just by loading and unloading the containers.

Figure 6:
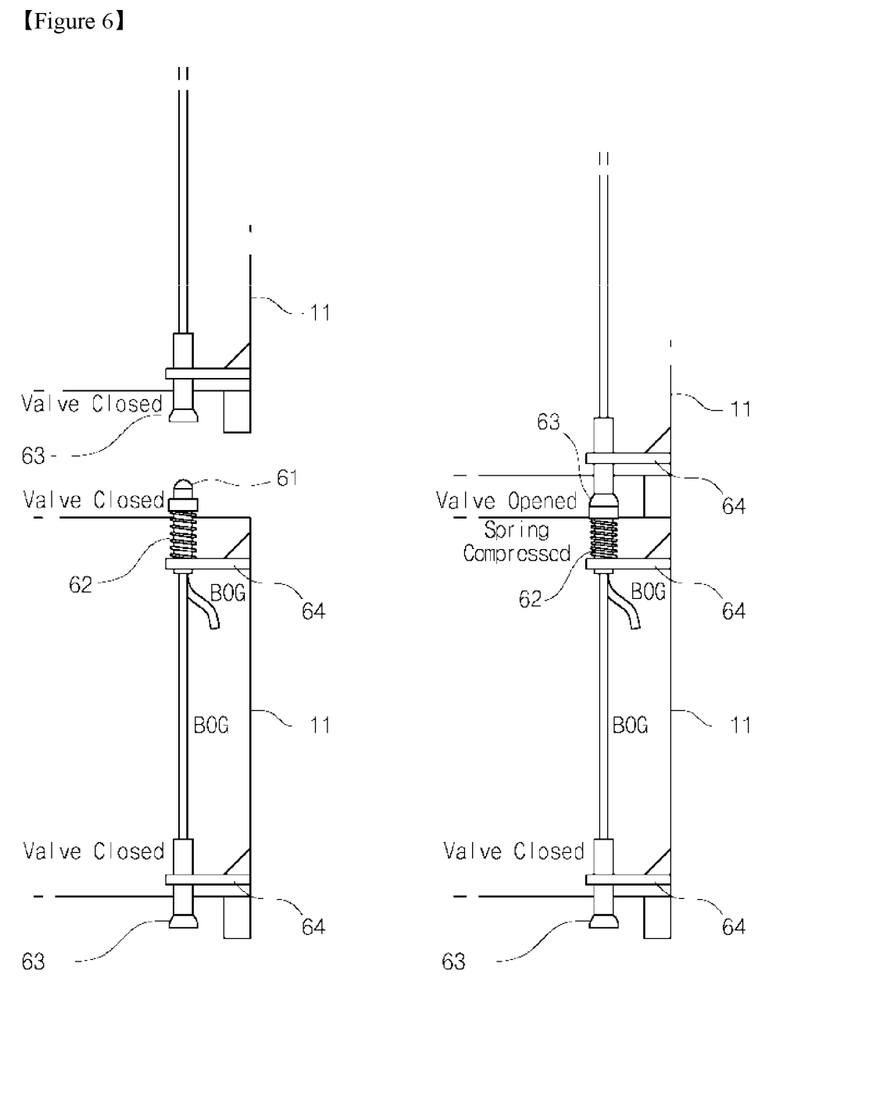
FIG. 6 is a view schematically illustrating a boil-off gas pipe connecting structure of the natural gas hydrate tank container loading system enabling automated connection of the electric power line and the boil-off gas pipe according to the present invention.

Next, referring to FIG. 6, FIG. 6 is a view schematically illustrating the boil-off gas pipe connecting structure of the natural gas hydrate tank container loading system 10 enabling automated connection of the electric power line and the boil-off gas pipe according to the present invention, that is, FIG. 6 illustrates a specific configuration of part B indicated by a dotted line in FIG. 2.

In more detail, as illustrated in FIG. 6, the boil-off gas pipe connecting structure of the natural gas hydrate tank container loading system enabling automated connection of the electric power line and the boil-off gas pipe according to the exemplary embodiment of the present invention is configured such that a conical valve opening and closing protrusion 61 is formed at one end side of the boil-off gas pipe, and a compressive spring 62 is installed at a lower side of the valve opening and closing protrusion 61, and as a result, the valve opening and closing protrusion 61 is opened by being pressed downward, and the valve opening and closing protrusion 61 is closed when pressure is eliminated, and the boil-off gas pipe connecting structure is configured such that a connector 63, which is coupled to the valve opening and closing protrusion 61, is installed at the other end side of the boil-off gas pipe, and separate fixing means 64 are fixed to upper and lower end portions of the containers, respectively, thereby forming a connection valve which are automatically opened as the valve opening and closing protrusion 61 and the connector 63 come into contact with each other when stacking the containers.

With the aforementioned configuration, as illustrated in FIG. 6, when the upper gas hydrate tank container is stacked in the vertical direction, the valve opening and closing protrusion 61 of the lower container is automatically coupled to the connector 63 of the upper container as the valve opening and closing protrusion 61 of the lower container is inserted into the connector 63 of the upper container, and the valve opening and closing protrusion 61 is automatically opened as the compressive spring 62 is pressed by a load of the container, and when the upper container is removed, the valve opening and closing protrusion 61 is closed as the valve opening and closing protrusion 61 automatically returns back to the original state by the compressive spring 62.

That is, an operation of connecting the pipe for discharging boil-off gas is manually and individually performed in the related art, but according to the boil-off gas pipe connecting structure of the natural gas hydrate tank container loading system enabling automated connection of the electric power line and the boil-off gas pipe according to the exemplary embodiment of the present invention, the connecting structures are configured at both end sides of the boil-off gas pipe as illustrated in FIG. 6, and as a result, it is possible to automatically perform operations of connecting and disconnecting the boil-off gas pipe just by loading and unloading the containers.

According to the configuration of the natural gas hydrate tank container loading system 10 enabling automated connection of the electric power line and the boil-off gas pipe according to the exemplary embodiment of the present invention, the refrigerator is operated by charging the battery with electric power generated by operating the electric generator by using boil-off gas (BOG) and electrical energy collected by the photovoltaic array 21, such that it is possible to ensure electric power sufficient to operate the refrigerator for maintaining phase equilibrium of the natural gas hydrate without being supplied with separate electric power, transport the natural gas hydrate to a long distance, solve problems of fire or environmental pollution caused by a discharge of boil-off gas, and more quickly and easily perform the operations of loading and unloading the natural gas hydrate tank containers by automatically performing the operation of connecting the electric power line and the pipe which is performed manually in the related art.

Therefore, as described above, the natural gas hydrate tank container loading system enabling automated connection of the electric power line and the boil-off gas pipe according to the present invention may be implemented.

In addition, according to the present invention which implements the natural gas hydrate tank container loading system enabling automated connection of the electric power line and the boil-off gas pipe, there is provided the natural gas hydrate tank container loading system enabling automated connection of the electric power line and the boil-off gas pipe which is configured to automatically connecting the electric power line and connecting the pipe by simultaneously stacking the respective natural gas hydrate tank container, thereby solving problems of transportation methods using the natural gas hydrate tank containers in the related art in that the operation of connecting the electric power line to the refrigerator and the operation of connecting the pipe for discharging boil-off gas are manually and individually performed after stacking the respective natural gas hydrate tank containers, which causes an inconvenience.

While the detailed description of the natural gas hydrate tank container loading system enabling automated connection of the electric power line and the boil-off gas pipe according to the present invention has been described above through the exemplary embodiments of the present invention, the present invention is not limited only to the contents of the exemplary embodiment, and thus the present invention may of course be variously modified, changed, combined, and substituted in accordance with design necessity and other various factors by those skilled in the art to which the present invention pertains.

DESCRIPTION OF REFERENCE NUMERALS

10: natural gas hydrate tank container loading system
11: natural gas hydrate tank container
12: refrigerator
13: electric power supply unit
14: sensor unit
15: electric power line 16: boil-off gas pipe
21: photovoltaic array
22: battery
23: electric generator
24: compressor
25: fuel tank
26: housing
27: fuel safety device
41: sloped waterproof hinge type plug
42: compressive spring
43: socket
44: pressor foot
61: valve opening and closing protrusion
62: compressive spring
63: connector
64: fixing means

The invention claimed is:

1. A natural gas hydrate tank container loading system enabling automated connection of an electric power line and a boil-off gas pipe, the natural gas hydrate tank container loading system comprising:
a plurality of natural gas hydrate tank containers which are stacked in a vertical direction;
for each natural gas hydrate tank container, a respective refrigerator one side of the natural gas hydrate tank container for maintaining phase equilibrium of natural gas hydrate stored in the natural gas hydrate tank container;
an electric power supply unit over an uppermost container among the plurality of the gas hydrate tank containers for supplying electric power for operating the respective refrigerators;
for each natural gas hydrate tank container, a respective electric power line at one side of the natural gas hydrate tank container, the respective electric power line including a connecting structure formed to be engaged at both ends for supplying electric power produced by the electric power supply unit to the respective refrigerators; and
for each natural gas hydrate tank container, a respective boil-off gas pipe at one side of the natural gas hydrate tank container, the boil-off gas pipe including a connecting structure formed to be engaged at both ends for supplying boil-off gas generated from the respective natural gas hydrate tank container to the electric power supply unit,
wherein,
each respective power line includes a first end located at a lower portion of the natural hydrate gas tank container and a second end located at an upper portion of the natural hydrate gas tank container, the first end including a socket structure to be aligned with and face the second end of the power line of a lower hydrate gas tank container, the first end also including a presser foot that extends toward the lower natural hydrate gas tank container, the second end including a sloping water-proof hinge plug with electrodes that are receivable in the socket of an upper natural gas hydrate gas tank container, the sloping water-proof hinge plug being in an open state in an inclined position with the electrodes extending toward the first end of the upper hydrate gas tank container or in a closed state in a reclined position, the sloping water-proof hinge plug being biased to the closed state and reclined position by a spring, the presser foot of the power line of the natural hydrate gas tank container configured to engage the sloping water-proof hinge plug of the lower hydrate gas tank container and causing the plug to incline and be in the open state and to automatically couple with the socket structure when the natural hydrate gas tank container and lower hydrate gas tank container are stacked in the vertical direction with the natural hydrate gas tank container of the respective power line.

2. The natural gas hydrate tank container loading system of claim 1, further comprising a sensor unit including a plurality of sensors including temperature sensors and pressure sensors for detecting internal pressure and temperature states of the natural gas hydrate tank containers; and a control unit which controls operations of the respective refrigerators and the electric power supply unit and operations of the loading system based on the states detected by the sensors of the sensor unit.

3. The natural gas hydrate tank container loading system of claim 1, wherein the electric power supply unit includes:
a photovoltaic array which generates electric power from sunlight;
an electric generator which is operated by boil-off gas generated by the natural gas hydrate tank containers;
a fuel tank which stores fuel to be supplied to the electric generator;
a compressor which mixes fuel supplied from the fuel tank with the boil-off gas generated from the natural gas hydrate tank containers and supplies mixed fuel and boil-off gas to the electric generator;
rechargeable battery cells which store electrical energy generated by the photovoltaic array, and the electric generator or both;
a fuel safety device which prevents fire and explosion caused by a reverse flow during combustion of the boil-off gas and
a housing which accommodates the electric generator, the fuel tank, the compressor, the battery cells, and the fuel safety device,
wherein;
the electric power supply unit charges the battery cells using power from the electric generator operated by using the photovoltaic array and the boil-off gas, and operates the refrigerator and the compressor using electrical energy with which the battery is charged, such that phase equilibrium in each natural gas hydrate tank container is always maintained without separate external electric power.

4. The natural gas hydrate tank container loading system of claim 2, wherein the loading system further includes:
a display unit which displays a current state of the loading system including the internal temperatures and pressures in the natural gas hydrate tank containers,
a communication unit which transmits the current states of the loading system to the outside, and
a fire extinguisher.

5. A natural gas hydrate tank container loading system enabling automated connection of an electric power line and a boil-off gas pipe,
a plurality of natural gas hydrate tank containers which are stacked in a vertical direction;
for each natural gas hydrate tank container, a respective refrigerator at one side of the natural gas hydrate tank container for maintaining phase equilibrium of natural gas hydrate stored in the natural gas hydrate tank container;

an electric power supply unit over an uppermost container among the plurality of the gas hydrate tank containers for supplying electric power for operating the respective refrigerators;

for each natural gas hydrate tank container, a respective electric power line at one side of the natural gas hydrate tank container, the respective electric power line including a connecting structure formed to be engaged at both ends for supplying electric power produced by the electric power supply unit to the respective refrigerators; and for each natural gas hydrate tank container, a respective boil-off gas pipe at one side of the natural gas hydrate tank container, the boil-off gas pipe including a connecting structure formed to be engaged at both ends for supplying boil-off gas generated from the respective natural gas hydrate tank container to the electric power supply unit, wherein, each boil-off gas pipe includes (a) a first end located at a lower portion of the natural gas hydrate gas tank container and a second end located at an upper portion of the natural gas hydrate gas tank container located; (b) a valve with an opening and closing protrusion at the second end of the boil-off gas pipe, the valve being opened when the protrusion is pressed downward and closed when the protrusion is released; (c) a spring at a lower side of the valve to bias the protrusion to the closed portion; (d) a connector at the first end and positioned so as to be coupled to the valve opening and closing protrusion of a lower natural gas hydrate tank container; and (e) a fixing means which fixes the valve opening and closing protrusion, the spring, and the connector to upper and lower ends of the natural gas hydrate tank container, respectively, when the respective natural gas hydrate tank container is vertically stacked on the lower natural gas hydrate tank container, the valve of the lower natural gas hydrate tank container, is caused to automatically open as the valve opening and closing protrusion of the lower natural gas hydrate tank container and the connector of the respective natural gas hydrate tank container come into contact with and automatically couple to each other, and when the respective natural gas hydrate tank container is unstacked from the lower natural gas hydrate tank container, the valve opening and closing protrusion of the lower natural gas hydrate tank container is caused to automatically uncouple from the connector and to close the valve of the lower natural gas hydrate container under the bias of the spring.

6. A natural gas hydrate transportation ship comprising the natural gas hydrate tank container loading system according to claim 1.

7. A natural gas hydrate transportation method configured to transport natural gas hydrate by using the natural gas hydrate tank container loading system according to claim 1.

8. The natural gas hydrate tank container loading system of claim 1, wherein the spring of the natural hydrate gas tank container of the respective power line is a compression spring.

9. The natural gas hydrate tank container loading system of claim 5, wherein the spring of the natural hydrate gas tank container of the respective boil-off gas pipe is a compression spring.

* * * * *